United States Patent Office 2,766,298
Patented Oct. 9, 1956

2,766,298

MANUFACTURE OF DDT

David B. Guthrie, St. Louis, and William S. Knowles, Kirkwood, Mo., assignors to Monsanto Chemical Company, St. Louis, Mo., a corporation of Delaware No Drawing. Application February 24, 1953,
Serial No. 338,623

6 Claims. (Cl. 260—649)

This invention relates to the manufacture of trichloromethyl diaryl methanes and more specifically pertains to the recovery of sulfuric acid from the reaction mixtures containing trichloromethyl diaryl methanes.

Trichloromethyl diaryl methane compounds are exceedingly effective for the control of certain insect pests. These compounds are prepared by condensing a chloral yielding compound such as anhydrous chloral, chloral hydrate, chloral alcoholate, and chloral acetal with an aromatic compound having a replaceable hydrogen in the presence of sulfuric acid as the agent for promoting condensation. Such reactions do not produce a pure trichloromethyl diaryl methane compound but rather produce isomeric mixtures which do not possess a sharp melting point but rather gradually softens, forms a mush and finally becomes liquid. Obviously, quality control cannot be maintained by melting point determination. However, satisfactory quality control can be achieved by determining the set point or crystallizing point of the mixture by the cooling curve method. In the manufacture of 2,2 - bis(p - chlorophenyl)1,1,1 - trichloroethane (DDT), as isomeric mixture containing primarily the para,para isomer (melting point 107–108° C.) is desired. Isomeric mixtures having a set point of 88° C. and above are considered to contain a satisfactory quantity of the para,para isomer for insecticidal use.

The process for the manufacture of DDT as commonly employed in industrial practice comprises reaction at −10° C. to 30° C. a chloral yielding compound with an excess of monochlorobenzene in the presence of concentrated sulfuric acid, usually sulfuric acid containing 95% to 108% $H_2SO_4$ (98% $H_2SO_4$ fortified with $SO_3$). A considerable portion of the sulfuric acid is consumed through the sulfonation of the excess chlorobenzene generally employed in the condensation reaction. The extent of the sulfonation is, of course, dependent upon the excess of monochlorobenzene employed. This sulfonation represents a complete loss of chlorobenzene and sulfuric acid and furthermore, results in the contamination of the spent sulfuric acid thereby precluding its use in other chemical processes.

Several processes for the recovery of DDT from the mixture resulting from the above described condensation reaction have been proposed. The one heretofore most widely used comprises discharging the mixture containing spent acid and DDT into a rather large volume of water. By this quenching process, the solid DDT can be readily recovered from the acidic aqueous quench. However, this process reduces the concentration of $H_2SO_4$ from a concentration of about 70% to 90% by weight as existing in the condensation spent acid to a concentration of about 30% to 35% $H_2SO_4$ by weight. This dilute sulfuric acid, having little or no commercial value, is discarded. Thus a great quantity of a potentially useful industrial chemical is wasted by this quenching process.

Another process proposed for the separation and recovery of DDT from the spent acid involves heating the mixture produced by the condensation reaction until the DDT is molten, generally 85° to 90° C. Two liquid layers form. The lower layer, being the spent acid, is withdrawn from the reactor. By this process molten DDT is charged by the strong spent acid containing 70 to 90% $H_2SO_4$ thereby producing an inferior product. Consequently, this process has not been considered as being suitable for industrial practice.

Still another process proposed for the recovery of DDT from the mixture resulting from the condensation process involves the use of an inert water-immiscible solvent. The solvent is added to the reaction mass generally after the condensation is complete to dissolve the DDT. By this process two liquid layers are formed. Again the lower layer is the spent acid and is withdrawn from the condensation reactor. This recovery or separation process adds the additional expensive step of solvent recovery and for that reason has achieved only limited acceptance for industrial practice.

Perhaps the simplest process for separating solid DDT from the spent condensation acid would be to filter the mixture produced by the condensation reaction. Although theoretically sound, this process has many serious disadvantages which have not made it practical for industrial application. The most serious disadvantage of this process lies in the fact that the condensation reaction does not produce particles of uniform size but rather produces a considerable quantity of very fine solid particles. A portion of these DDT fines are suspended in the spent acid and remain suspended therein even after the reaction mass has been allowed to stand as long as two or three days. Consequently, filtration does not produce satisfactory results not only because of the suspended fines in the spent acid but also because the unsuspended fines plug the filter surfaces and slow the filtration process to such an extent that the filtering time cycle is prohibitively long for industrial use.

From the foregoing it is readily apparent why the practice of quenching the reaction mass in a large volume of water with the tolerance of the subsequent loss of substantially all of the sulfuric acid has become the general industrial process. A practical method for recovering DDT from the condensation process whereby substantially all of the spent acid containing 70% to 90% $H_2SO_4$ by weight can be recovered without adding expensive steps or without producing deleterious effects on the valuable insecticidal product would obviously be immediately and widely accepted by the industry. Such a process would result in a reduction in cost of producing DDT due to an appreciable allowable credit for the valuable industrial chemical recovered in a usable form as well and at the same time result in an appreciable reduction in the use of new concentrated sulfuric acid. Therefore, such a recovery process would be a significant and valuable advance in the art.

It is an object of this invention, therefore, to provide a process for the manufacture of DDT whereby substantially all of the sulfuric acid can be recovered in a reusable form. It is a further object of this invention to provide a process for recovering from the process where a chloral yielding compound is condensed with an aromatic compound having a replaceable hydrogen in the presence of concentrated sulfuric acid, substantially all of said sulfuric acid in a reusable form. An additional object of this invention is to provide a process for the recovery of sulfuric acid of sufficient quality to permit its reuse in other chemical processes.

The objects of this invention can be accomplished by condensing substantially stoichiometric portions of a chloral yielding compound with an aromatic compound having a replaceable hydrogen in the presence of from 2 to 4 moles of $H_2SO_4$ per mole of aromatic compound at a temperature of from −10° C. to 30° C. heating the resulting reaction mixture to a temperature of from about 35° C. to just below the incipient melting point of trichloromethyl diaryl methane until the liquid reaction medium becomes clear and recovering solid trichloromethyl diaryl methane from the liquid reaction medium. The term "incipient melting point" as employed in the specification and claims is intended to mean that point at which the mixture of trichloromethyl diaryl methanes produced by the condensation reaction just begins to soften in the process of melting. The incipient melting point for the mixture known as DDT is about 85° C. The liquid portion recovered is a sulfuric acid substantially equal in volume to the volume of sulfuric acid charged but is slightly more dilute than the sulfuric acid charged because of the water formed by the condensation reaction. The recovered sulfuric acid contains a small amount of organic material probably the sulfonated product of the aromatic reactant. By fortifying the recovered sulfuric acid with $SO_3$ or with sulfuric acid containing more than 100% $H_2SO_4$, the recovered acid is made up to the strength and volume originally employed and in this manner can be used over again as the condensation agent.

The following specific examples describing the preparation of DDT are intended to be merely illustrative of the process of this invention and, as hereinbefore stated, are applicable to the preparation of all trichloromethyl diaryl methanes and the recovery of usable spent sulfuric acid therefrom.

*Example I*

Into a one-liter flask there were charged 73.7 g. (0.5 mole) of distilled chloral and 112.5 (1.0 mole) of chlorobenzene. The resulting mixture was stirred and cooled to a temperature between 0 and 5° C. To the cooled mixture there was added 212 cc. of sulfuric acid (99.5% $H_2SO_4$). The resulting reaction medium was stirred and maintained at a temperature between 0 and 5° C. for 12 hours. At the end of this period, it was found that, when the stirring was stopped, most of the DDT which had formed into small rice-like pellets settled out but the acid layer was very milky in appearance due to the suspension of finely divided particles of DDT. Stirring was then continued and the reaction mixture was heated to 38° to 40° C. and held there for two hours to remove the unreacted chlorobenzene. This time when stirring was discontinued and the batch allowed to settle, all of the DDT particles separated immediately from the spent acid to form a clear acid layer. The clear spent acid, dark yellow in color, was drained from the reactor and collected. The amount of spent acid collected was about 200 cc. in volume. The DDT produced was quenched with boiling water and refined in the usual manner. By this process a yield of DDT of 80.6% based on the reactants charged having a set point of 90.6° C. was obtained.

*Example II*

The process described in Example I was repeated except that the reactants were cooled to a temperature between 10° C. and 15° C. and the sulfuric acid contained 98.8% $H_2SO_4$. Also the sulfuric acid was added slowly over a period of about 40 minutes. The reaction mixture was stirred for 12 hours and its temperature was maintained between 15 and 18° C. At the end of this reaction period, the acid layer was not clear but did become clear when the reaction mixture was heated for about two hours at 45 to 50° C. When stirring was discontinued, the DDT readily separated from the reaction mixture leaving a lower acid layer which was withdrawn from the reactor and collected. The volume of spent acid collected was about 200 cc. The yield of the refined DDT from this process was 83.2% and the refined material had a crystallizing point of 90.8° C.

*Example III*

The process described in Example I was repeated except that one-half the quantity, 106 cc., of sulfuric acid was employed. Also the reaction mixture was stirred for 13 hours while allowing the reaction temperature to increase slowly until it reached 27° C. At the end of the 13-hour reaction period the acid layer contained a large quantity of DDT fines which agglomerated when the condensation mass was heated at a temperature between 53° and 57° C. for two hours. When stirring was discontinued, the reaction mass separated into a DDT layer and a spent acid layer. The spent acid layer was withdrawn and saved. The volume of sulfuric acid recovered was about 100 cc. The yield of the refined DDT was 83.2% and the crystallizing point was 88.6%.

*Example IV*

The process described in Example III was repeated except that the sulfuric acid charged contained 100% $H_2SO_4$. At the end of the condensation reaction, the mixture was heated to a temperature between 58° and 62° C. until the acid layer became clear. On settling, the reaction mixture formed a DDT layer and a lower spent acid layer which was drained almost completely from the solid DDT layer. The volume of spent acid recovered was about 100 cc. The yield of refined DDT was 83.6% and the crystallizing point was 89.6° C.

*Example V*

The process described in Example I was repeated except that the acid charged was 232 cc. of sulfuric acid obtained by fortifying the recovered spent acid from Example II with oleum until the water content was 0.4%. This acid was added over a period of about 40 minutes. At the end of the condensation reaction, the acid layer contained a considerable amount of DDT fines. However, after heating to a temperature between 48 and 50° C. the acid layer cleared in about two hours. When allowed to settle, the reaction mixture readily formed a DDT layer and a spent acid layer having a clear dark red color. The acid layer was drained almost completely and was substantially equal in volume to the volume of fortified spent acid charged. The yield of refined DDT was 81% and the crystallizing point was 91.4° C.

*Example VI*

To a 2-gallon reactor there was charged 4.1 pounds of chlorobenzene and 2.7 pounds of distilled chloral. The reactants were cooled to a temperature between 0 and 5° C. and then 0.92 gallon of 99.5% $H_2SO_4$ were added with cooling. The resulting mixture was stirred and maintained at a temperature between 0 and 5° C. for 14 hours. When the agitator was shut off, most of the DDT floated to the top of the reaction mixture, but the lower acid layer remained cloudy due to the suspension of fine particles of DDT in the acid. From past experience, separating the DDT and acid by filtration at this point would require several hours at best and then the acid recovered would contain DDT fines. The reaction mass was stirred and heated to a temperature between 38° and 45° C. until the acid layer became clear, about two hours. Stirring of the resulting mixture was stopped, the mixture allowed to settle, and the clear dark red spent acid layer which formed in but a few minutes was rapidly drained from the reactor. The amount of spent acid recovered was substantially equal to the volume of fresh sulfuric acid charged. The spent acid was fortified with oleum until the water content of the fortified acid was 0.4%. All of this fortified acid was reused in a subsequent condensation reaction to prepare more DDT. The yield of DDT from this batch and the following batches employing recovered and fortified spent acid averaged about 81.8%. The crystallizing point of the refined products ranged from 89.8° C. to 92.0° C.

It will be noted that although the spent acid from the industrial process described in Example VI was refortified many times, the quality of the DDT produced in the presence of the recovered fortified sulfuric acid did not fall below an acceptable standard. It will also be noted that the average yield was quite comparable to the yields obtained by the laboratory preparation.

The spent acid recovered from the DDT process need not be reused in the DDT process but can be recovered and used in the preparation of fertilizers, or can be used in the distillation of chloral, or can be used in any other process where an industrial grade of sulfuric acid is satisfactory. It is also to be noted that the process of this invention does not employ filters or mechanical means for separating the DDT and the spent acid. As will be appreciated, the use of such filters and mechanical means for separating DDT and concentrated sulfuric acid must be constructed of special acid resistant materials. Therefore, the process of this invention eliminates the use of special recovery equipment.

While the process of this invention has been described in detail with respect to the preparation of DDT by the condensation of chloral with monochlorobenzene, it is not desired nor intended that this invention be limited solely thereto for, as hitherto stated, this invention is applicable to the preparation of DDT from other chloral yielding compounds as well as being applicable to the preparation of other trichloromethyl diaryl methane compounds.

The process of this invention is applicable where in place of chloral there is substituted other chloral yielding compounds such as chloral hydrate, chloral alcoholate and chloral acetal. Such materials yield chloral in the presence of sulfuric acid and consequently they can be substituted in the reaction provided suitable adjustment is made for the amount of water liberated and the amount of sulfuric acid so used in converting these materials to chloral. The reaction proceeds simply as though it were the reaction between chloral and the aromatic compound. Thus the use of other chloral containing materials can be considered in effect as alternate ways of introducing chloral into the reaction mixture.

Also the process of this invention is applicable when in place of chlorobenzene there is substituted other aromatic compounds having replaceable hydrogen, especially those which contain such groups as chlorine, bromine, iodine, fluorine, hydroxy, methyl, ethyl, or other alkyl groups and methoxy and ethoxy and other alkoxy groups which direct replacement of ortho and para hydrogen. It is within the scope of this invention to substitute such compounds as benzene, fluorobenzene, bromobenzene, iodobenzene, methoxybenzene, phenetol, phenol, toluene, m-xylene, ethyl benzene, naphthalene, tetrahydronaphthalene and like homologues and derivatives of benzene for chlorobenzene in the condensation process.

What is claimed is:

1. In the process for preparing 2,2-bis(p-chlorophenyl)-1,1,1-trichloroethane by the condensation of chloral with monochlorobenzene in the presence of sulfuric acid, the steps comprising condensing substantially stoichiometric proportions of mono chlorobenzene and chloral in the presence of concentrated sulfuric acid, heating the reaction mixture resulting from said condensation to a temperature of from about 35° C. to about the incipient melting point of the 2,2-bis(p-chlorophenyl)1,1,1-trichloroethane product until the acid layer is clear, allowing the resulting mixture to settle thereby forming a layer containing the solid 2,2-bis(p-chlorophenyl)1,1,1-trichloroethane product and a lower layer of acid, and withdrawing the acid layer.

2. The process for preparing 2,2-bis(p-chlorophenyl)-1,1,1-trichloroethane which comprises condensing stoichiometric portions of monochlorobenzene and a chloral containing compound in the presence of concentrated sulfuric acid as the condensation promoting agent at a temperature from about —10° C. to 30° C., heating the resulting mixture to a temperature of from about 35° C. to about the incipient melting point of the trichloroethane product until the acid therein becomes clear, allowing this reaction mixture to settle thereby forming a layer of solid material and a lower acid layer, withdrawing said acid layer and recovering the 2,2-bis(p-chlorophenyl)1,1,1-trichloroethane, said process being further characterized by the fact that the acid withdrawn is substantially equal in volume to the acid charged.

3. The process of claim 2 wherein the sulfuric acid employed as the condensation promoting agent is the recovered sulfuric acid fortified to the desired strength.

4. The process for preparing 2,2-bis(p-chlorophenyl)-1,1,1-trichloroethane which comprises condensing stoichiometric portions of monochlorobenzene with chloral in the presence of sulfuric acid containing 95% to 108% $H_2SO_4$ at a temperature of from —10° to 30° C., heating the resulting mixture to a temperature of from about 35° C. to about the incipient melting point of the trichloroethane product until the acid therein becomes clear, allowing this reaction mixture to settle and form a layer of acid and a layer of solid material, withdrawing said acid layer and recovering the 2,2-bis(p-chlorophenyl)1,1,1-trichloroethane, said process being further characterized by the fact that the acid withdrawn is substantially equal in volume to the acid charged.

5. The process of claim 4 wherein the sulfuric acid employed as the condensation promoting agent is the sulfuric acid recovered from the previous condensation process and fortified to a composition containing less than 5% by weight of water.

6. The process of claim 4 wherein the sulfuric acid employed as the condensation promoting agent is the sulfuric acid recovered from the previous condensation process and fortified to a composition containing 0.4% by weight of water.

References Cited in the file of this patent

UNITED STATES PATENTS 2,460,865    Wilson _____ Feb. 8, 1949